United States Patent [19]
Abe et al.

[11] 3,762,042
[45] Oct. 2, 1973

[54] METHOD OF MANUFACTURING A CORE SEGMENT FOR A DISC TYPE INDUCTION MOTOR ROTOR

[75] Inventors: Michio Abe, Kasuga-shi; Naoyuki Maeda, Inuyama-shi, both of Japan

[73] Assignee: Tokai Cold Forming Co., Ltd., Aichi-ken, Japan

[22] Filed: June 17, 1971

[21] Appl. No.: 153,989

Related U.S. Application Data

[63] Continuation-in-part of Ser. No. 773,738, Nov. 6, 1968, abandoned.

[52] U.S. Cl................ 29/598, 29/DIG. 17, 29/607, 72/377, 310/42, 310/156, 310/216, 310/268
[51] Int. Cl....................... H02k 15/02, H02k 15/10
[58] Field of Search............... 29/598, 607, DIG. 17; 72/377; 310/268, 156, 42, 216

[56] References Cited
UNITED STATES PATENTS

| | | | |
|---|---|---|---|
| 2,629,923 | 3/1953 | Johnson, Jr. | 29/DIG. 17 |
| 3,613,227 | 10/1971 | Parker | 29/598 X |
| 2,567,422 | 9/1951 | Camp | 310/268 X |
| 3,069,577 | 12/1962 | Lee | 310/268 X |

*Primary Examiner*—Richard J. Herbst
*Assistant Examiner*—Carl E. Hall
*Attorney*—Kurt Kelman

[57] ABSTRACT

An electromagnetic pure iron blank is cut to a predetermined length and the blank is cold-formed to make a core segment for an induction motor rotor so that the crystal flow in the pure iron blank in a direction perpendicular to the planes of two parallel wedge-shaped faces of the segment is highly oriented at and around a larger outer face of the segment and is oriented only a little at and around the small inner face thereof.

4 Claims, 28 Drawing Figures

PATENTED OCT 2 1973　　　　　　　　　　　　3,762,042

INVENTORS
MICHIO ABE
NAOYUKI MAEDA

BY　Kurt Kelman

AGENT

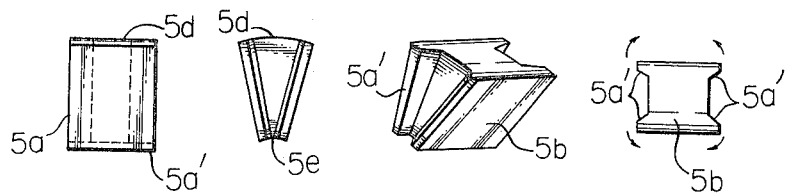
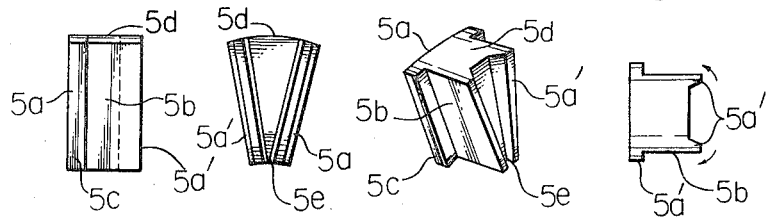
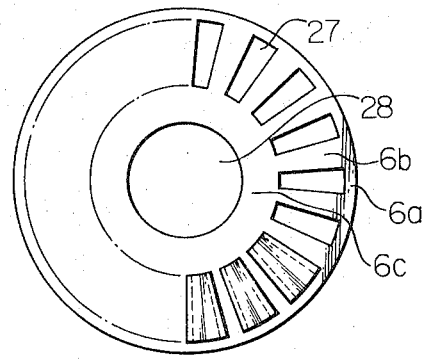
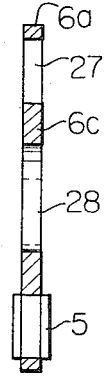
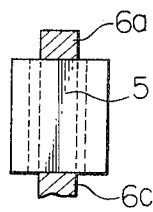
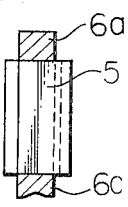
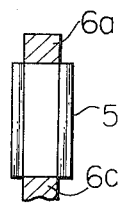

METHOD OF MANUFACTURING A CORE SEGMENT FOR A DISC TYPE INDUCTION MOTOR ROTOR

The present invention relates to a method of manufacturing a core segment for a rotor of induction motors of the axial airgap type, such as described, for instance, in U. S. Pat. No. 3,296,475 and/or U. S. application Ser. No. 643,171, filed June 2, 1967 and copending with our application Ser. No. 773,738, filed Nov. 6, 1968, now abandoned of which this is a continuation-in-part.

Dynamo-electric machines of the axial airgap type have a disc type rotor comprising a plurality of wedge-shaped core segments arranged in a circular array. The core segments have their wider ends adjacent the outer periphery of the circular array and their narrower ends adjacent the axial center of the array. Supporting means for the array comprises a secondary conductor forming radially extending supporting members between the wedge-shaped core segments and a rim surrounding the core segments adjacent the outer periphery of the array.

Induction motors of this type are seldom found in practical use, and methods of manufacturing the rotor core segments have improved little over the years. This type of induction motor has, therefore, rarely been used in industry, its characteristics being very poor in comparison with the radial airgap type induction motors. In recent years, however, some advantages of the axial airgap type of motor have been recognized, for example the fact that the length in the axial direction is shorter, the airgap may be narrowed since the rotor is of a disc type, and the total weight of the motor is considerably less than that of radial airgap type machines. Notwithstanding these advantages, no satisfactory axial airgap type induction motor has been placed on the market.

It is an object of this invention to provide an improved method for producing the core segments for the rotors.

Broadly, this is accomplished with core segments having two parallel faces, two wedge-shaped side faces, a small inner face and a larger outer face, the latter four faces extending in planes perpendicular to the planes of the parallel faces, by cutting an electromagnetic pure iron blank to a predetermined length, and cold-forming the blank to form a wedge-shaped core segment so that the the crystal flow in the pure iron blank in a direction perpendicular to the planes of the parallel faces is highly oriented at and around the larger face and is oriented only a little at and around the small face.

Preferably, flange portions are formed in the core segment during the cold-forming thereof to impart to the core segment a substantially H-shaped cross section.

Figure 4:
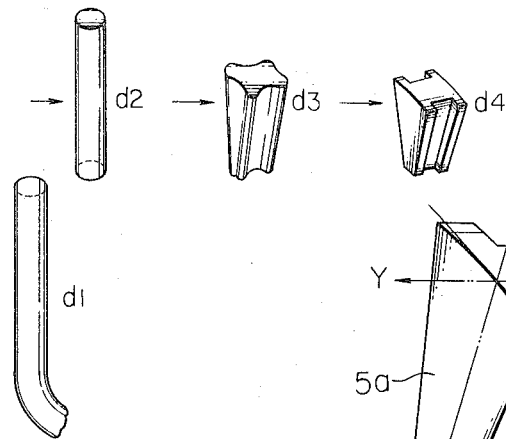
FIG. 4 is a schematic diagram showing a cold-forming process for the manufacture of the core segments.
Figure 5A:
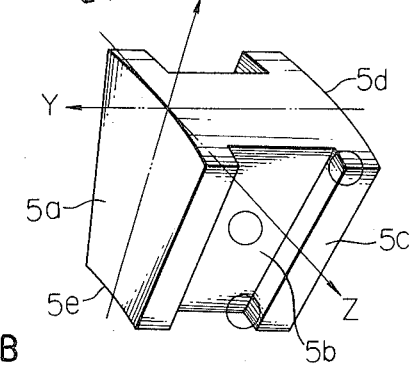
Figures 5B, 5C, 5D:
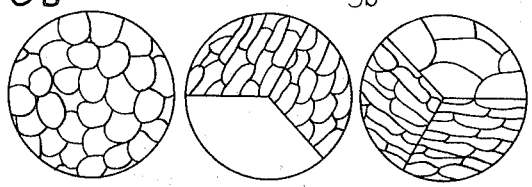
Figure 6:
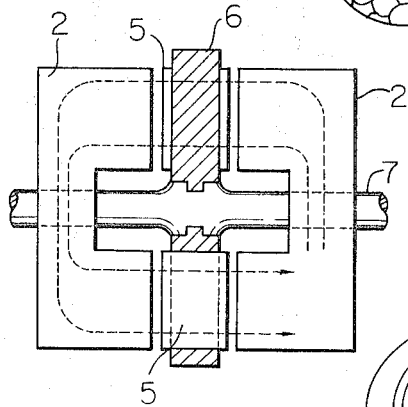
Figure 7:
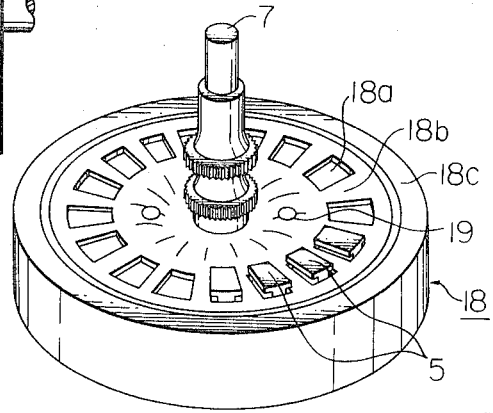
Figure 8:
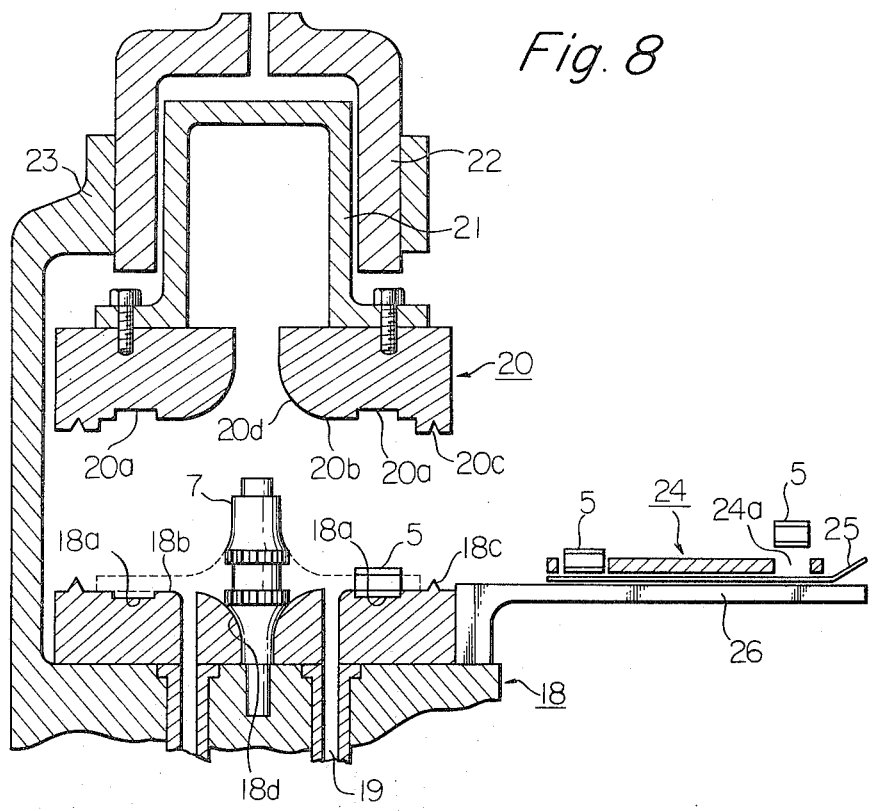
Figure 9A:
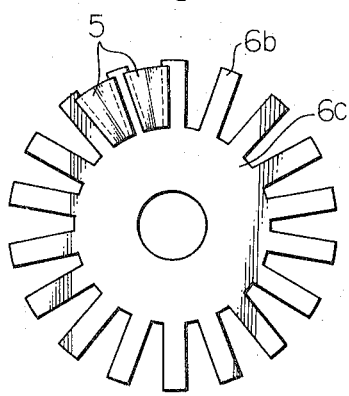
Figure 9B:
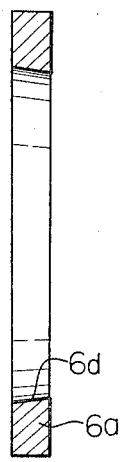
Figure 10:
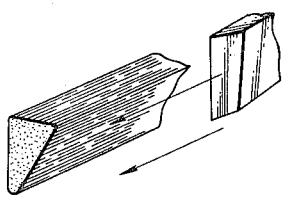

FIGS. 5A–D are schematic diagrams showing in FIGS. 5B–D the metal structure in the three encircled portions of a core segment seown in FIG. 5A manufactured according to the process illustrated in FIG. 4;

FIG. 6 is a side view, partly in cross section, showing the magnetic flux path passing through the core segments of an axial airgap type motor;

FIGS. 7 and 8 show a simplified die-casting machine for securing the core segments to each other and to the rotor shaft;

FIGS. 9A and 9B are plan and cross-sectional views, respectively, of another embodiment of the secondary conductor;

FIG. 10 is a perspective view of a core segment of modified shape;

FIGS. 11A–D and 12A–D are side, plane, perspective and top views, respectively, of core segments made in a cold-forming operation from the shape of FIG. 10;

FIGS. 13A and 13B are plan and cross-sectional views, respectively, of yet another embodiment of the secondary conductor and several core segments aligned therein;

FIGS. 14A and 14B show processes for securing the core segments of FIGS. 11 and 12, respectively, to the secondary conductor support;

FIG. 15 shows the completed arrangement of FIGS. 14A and 14B; and

Figure 16:
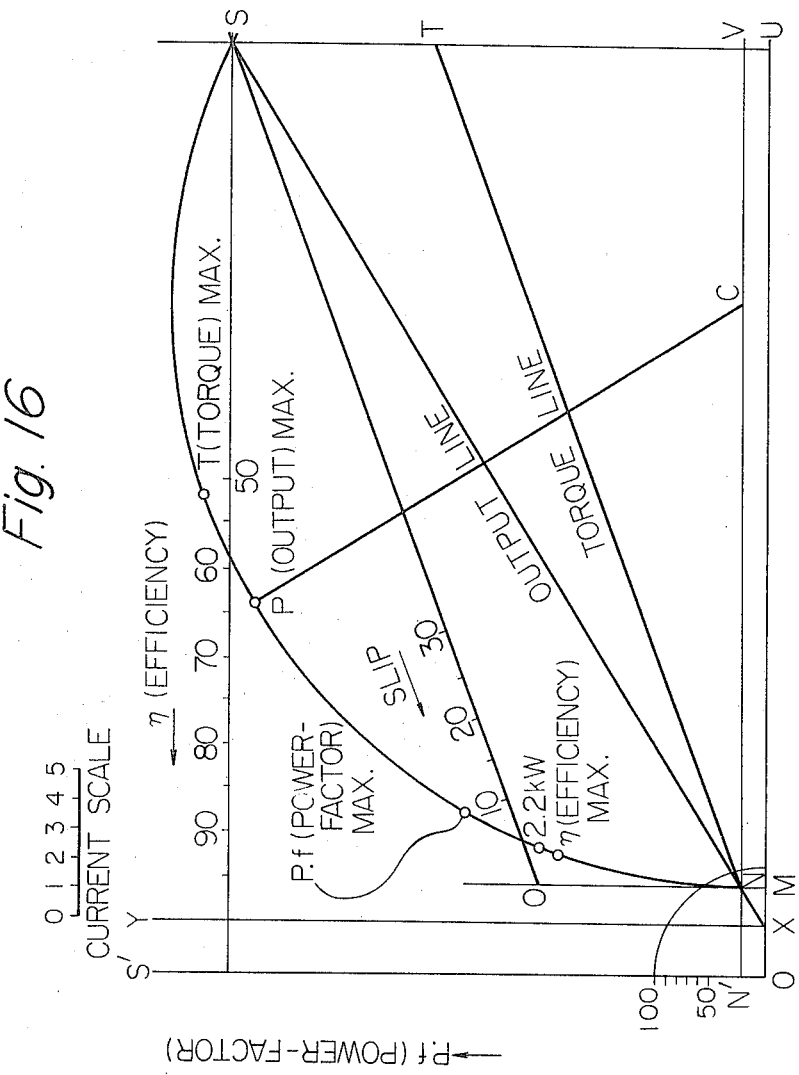

FIG. 16 is a Hyland's circle diagram of the operation of an induction motor with the secondary conductor of FIGS. 9A and 9B.

Figure 1:
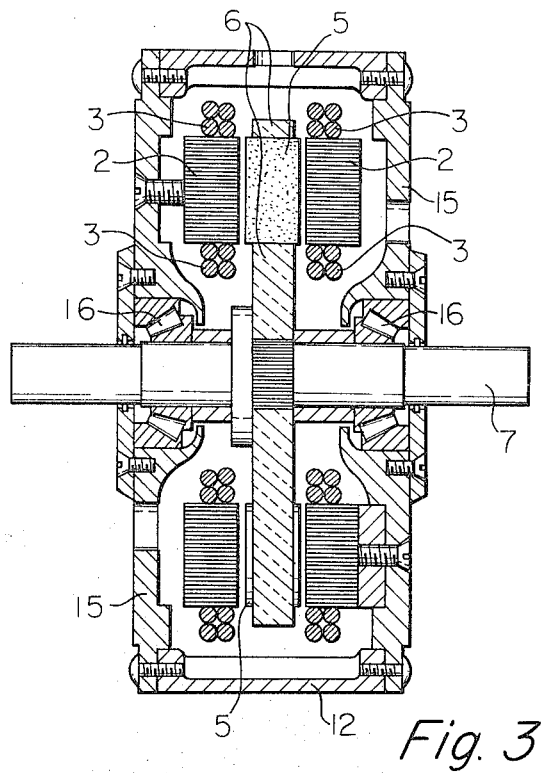
FIG. 1 is a longitudinal cross sectional view of one embodiment of an induction motor using rotor core segments manufactured according to the present invention.

Referring now to the drawing and first to FIG. 1, the rotor core segments 5 shown therein comprise "pure iron," e.g. iron having a degree of purity of 99.98 percent, of high permeability, rather than the "wrought" iron commercially available.

FIG. 1 shows a rotor mounted within motor casing 12. The rotor comprises a rotor shaft 7, a secondary conductor 6, and a plurality of wedge-shaped core segments 5 arranged in a circular array and supported in the secondary conductor. The rotor shaft 7 is supported by two ball bearings 16, 16 secured in bearing housings 15, 15. Left and right stators each comprising stator core 2 and stator windings 3 are mounted adjacent the rotor core segments.

Figures 2, 3:
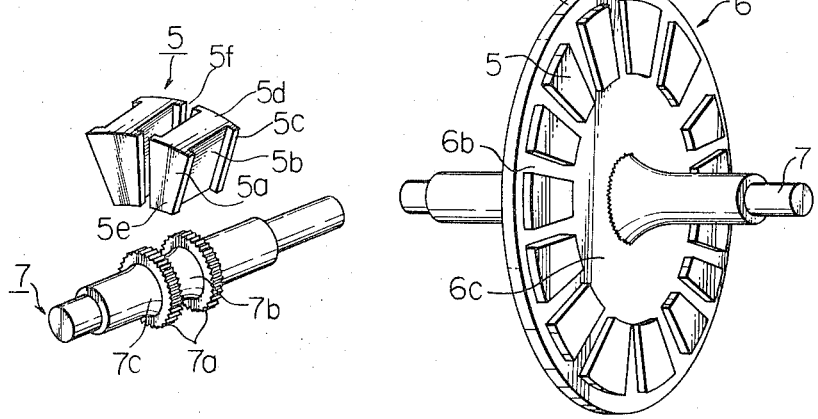
FIG. 2 is a perspective view showing the relationship between the rotor core segments and a rotor shaft arranged in position.
FIG. 3 is a perspective view of a rotor assembled according to this invention.

FIG. 2 shows the relationship between the alignment of shaft 7 and the core segments 5 of the rotor, and FIG. 3 shows the assembled rotor after the core segments have been secured in the secondary conductor support.

According to a preferred feature of the present invention, high permeability iron of a degree of purity of at least 99.6 percent is used for the core segments 5. Iron of such purity is, for example, discussed on page 786 of "Metals Handbook," 8th ed., Vol. 1, in the following words:

"For experimental uses, 99.99 percent pure iron can be obtained with maximum permeability of about 100,000; this grade of iron has a hysteresis loss of about 100 ergs per cu.cm. per cycle for a flux density of 10,000 gausses. The saturation value of iron is given as $4\pi Is = 21,580 \pm 10$ gausses, based on a density of 7.878, where Is is the intensity of magnetization or magnetic moment per unit volume."

However, the industrially attainable purity of iron is limited to 99.6 percent to 99.8 percent and, to facilitate melting, elastic working, and plastic deformation, a small amount of alloy is generally added to pure iron, the amount being insufficient to degrade the magnetic property of the iron. We have found that the magnetic characteristic of iron having a purity of at least 99.6 percent is excellent in the directions along the crystal flow, as will become apparent herein. Thus, the objects of this invention may be achieved well with iron of a purity no lower than 99.6 percent, which is referred to as "electromagnetic pure iron" in the present-day industry. The motors hereinbelow more fully described and tested were constructed with core segments made of such electromagnetic pure iron commercially available in Japan.

As shown in FIG. 2, each core segment 5 has an I-shaped cross section, one face 5a thereof being wedge-shaped, the flange portion 5c being a projection of the wedge-shaped face 5a and defining an air duct 5f with a corresponding flange portion of the adjacent core segment. The cylindrical faces 5d and 5e of each core segment contact the rim 6a and the inner disc 6c, respectively, of the secondary conductor 6, as shown in FIG. 3.

The rotor shaft 7 has two ratchet portions 7a, 7a for receiving torque, a reduced diameter portion 7b being defined between the ratchet portions for receiving thrust. A curved shaft portion 7c is adjacent the ratchet portions.

FIG. 4 shows a method of manufacturing the core segments. In this method, a cylindrcal iron bar d1 which has a cross sectional area corresponding to the corss sectional area of the inner cylindrical face 5e of the core segment shown in FIG. 2 is first cut down to have the same volume as that of the completed core segment. This is donw by feeding the bar d1 into a header where it is cut to form blank d2 of a predetermined length. This blank is then worked in a compression die and a preforming punch to form, in the first stage, an element d3 and, in the second stage, the finished form d4 in a subsequent die and punch. This is a cold-forming operation in which the normal crystallographic structure of the metal receives compression, reduction and expansion working. As a result, crystal flow occurs, resulting in the metal structure schematically shown in FIGS. 5A–D.

A double blow cold header or progressive header may be used in this process to manufacture 100 to 200 core segments per minute, each exhibiting the superior magnetic properties hereinafter described.

FIGS. 5A–D illustrate the crystal flow which occurs in a core segment formed in the above-described cold-forming process. Since the core segment is reduced and shaped from a circular iron blank having a cross section as large as that of the cylindrical face 5e, the crystal flow occurring in channel 5b adjacent the inner cylindrical face 5a results in a grain structure which is somewhat narrower and longer along the X-axis than that which occurs near the outer cylindrical face 5d. Upon reaching the outer face 5e, this tendency decreases and, at the upper portion adjacent the outer face, the effects of compression begin to appear and the crystallographic orientation is compressed and flattened along the Y- and Z-axes. Further, at the flange portions 5c, the crystallographic orientation is aligned along the Z-axis, method of forming the projections 5c, and at the upper channel portion 5b the grain structure is aligned along the Y-axis.

Because of the crystallographic orientation in the metal of the rotor core segments, the intensity of any magnetic flux induced in the rotor core is greater along the Y-axis at and around the outer cylindrical face 5d whereas, in channel 5b, near the inner face 5e, the magnetic flux intensity along the Y-axis is reduced. As a result, the flux distribution along the Y-axis is improved, as will be explained hereinafter.

FIG. 6 is a simplified cross sectional view of FIG. 1 and illustrates, in dotted lines, the magnetic flux path in the motor. Since an axial airgap type induction motor has a core or pole face which expands radially outwardly towards the periphery, the length of the magnetic path increases as one moves from the rotor shaft to the periphery. Therefore, the magnetic flux density within the core is high, at or near the center of the rotor, and low at and around the periphery thereof. Moreover, when fan-shaped core segments are used, the magnetic flux density generally induced therein varies over a wide range and is non-uniform so that the efficiency of the motor is poor. That is to say, as the magnetic flux passing through the center of the rotor shaft increases, the torque being generated decreases.

Although the total permeability of the core segments manufactured by the above-described cold-forming operation decreases a little, the crystal flow around the outer portion 5d of the rotor core is such that a decrease in permeability thereabout is subtantially prevented and the magnetic flux passes easily through the outer periphery of the rotor. As a result, the magnetic flux density about the center of the shaft decreases, relatively speaking, and the flux density in the outer periphery increases correspondingly so that the motor torque increases.

One method of manufacturing the rotor of FIG. 3 is described with reference to FIGS. 7 and 8. FIG. 7 shows four core segments 5 and the rotor shaft 7 arranged in a die 18 including a plurality of recesses 18a each having a depth corresponding to the thickness of flange portion 5c (FIG. 2) of the core segment 5, and a shape to match that of fan-shaped face 5a thereof. A face 18b of the die is utilized to form disc face 6b of the secondary conductor 6 which is a part of the rotor. A projection 18c of the die is provided for sealing upon die-casting, and a port 19 is provided as an inlet for molten metal.

FIG. 8 simply illustrates the die-casting operation using a fixed die 18 and a movable die 20 having portions 20a, 20b and 20c which correspond to, or match with, the conforming portions of fixed die 18 described hereinabove. Curved portions 18d and 20d of the dies engage with the correspondingly curved portin 7c of rotor shaft 7. The dies are mounted on base 23.

The right half of FIG. 8 shows the core segments 5 being inserted in the apertures 24a in an aligning frame 24 placed on a slidable plate 25 on a table 26. The core segments may be inserted manually or by an automatic feeding device. Apertures 24a have the same arrangement as recesses 18a of die 18. Distributed in apertures 24a of frame 24, the core segments 5 are advanced into the die 18, together with slidable plate 25 and frame 24. They are then dropped into the corresponding recesses 18a by withdrawing plate 25. After that, frame 24 is also withdrawn from die 18 to its original position on table 26. The rotor shaft 7 is then inserted in the shaft supporting portion 18d of the die 18, and the upper die 20 is lowered along guide cylinder 22 until the dies engage the shaft, leaving a space therebetween for die-casting the secondary conductor while the rotor shaft and the core segments are firmly held in position between the dies to form the integral rotor structure shown in FIG. 3. The channels 5f (FIG. 2) between the flange portions 5c of adjacent core segments function as air ducts so that a cooling effect is obtained.

An alternate method of manufacturing the rotor without a die-casting operation is described hereinbelow.

FIGS. 9A and 9B show another embodiment of a secondary conductor wherein a sheet of copper is employed instead of a die-cast core segment support. As shown, the copper sheet has an inner disc portion 6c wherefrom there extend radially projecting teeth 6b machined into the copper sheet in a finishing lathe, the teeth being finished by broach working after punching. Thereafter, core segments 5 are inserted, with a friction fit, between the teeth of the sheet. The outer secondary conductor ring 6a has a tapered face 6d so that it may be easily secured to the periphery of the inner conductor portion and, after the core segments have been aligned between the teeth of the inner portion, the outer ring is engaged therewith to form the rotor body. When the rotor shaft is secured in the central bore of the copper sheet by friction fit, a mechanically strong rotor similar to that of FIG. 3 is produced.

An alternative method of manufacturing the core segments will be described hereinbelow.

FIG. 10 shows a core blank which has been roughly drawn from electromagnetic pure iron or normal crystalline structure by means of a drawing die. The blank has a fan-shaped cross section and is subjected to working by means of a cold header to assume the shapes shown in FIGS. 11 and 12.

The difference between the shapes of the core segments of FIGS. 11 and 12 and that of FIG. 5 is that the former have fringe portion 5a' which may be rivetted to the secondary conductor of the rotor. Here again, it is possible to provide an advantageous crystallographic orientation in the metal by appropriately selecting the cross sectional area of the blank.

A secondary conductor suitable for riveting comprises a punched metal disc, as shown in FIGS. 13A and 13B. The disc may be an aluminum or copper sheet having a plurality of radially extending windows 27 around its periphery in which the correspondingly shaped core segments may be inserted. The central bore 28 in the metal disc receives the rotor shaft. The insertion of a fan-shaped core segment of the type shown in FIG. 11 in window 27 is illustrated in FIG. 14A, the core segment then being riveted on both sides thereof to the metal disc. Insertion of a core segment of the type shown in FIG. 12 in window 27 is illustrated in FIG. 14B but, in this case, only one side thereof is riveted. FIG. 15 shows the core segment secured to the disc.

The results of a test performed on an induction motor constructed in accordance with the present invention are given hereinbelow, the tested motor being of the type shown in FIG. 1 wherein the core segments of electromagnetic pure iron where manufactured in a cold-forming operation shown in FIG. 5, and the secondary conductor was that of FIG. 9. Both stators comprised conventional coiled cores.

The ratings of the tested motor were as follows:

| | |
|---|---|
| Output | 2.2KW |
| Voltage | 200 V |
| Frequency | 60 cps |
| Phases | 3 Max. |
| efficiency | |

Design factors were as follows:

| | |
|---|---|
| Number of core segments | 29 |
| Segment thickness in the direction of the shaft | 16 mm |
| Diameter of the rotor including outer face 5d | 165 mm |
| Diameter of the rotor including inner face 5e | 90 mm |
| Weight of core segments | 0.84 kg |
| Weight of secondary conductor | 1.32 kg |
| Total weight of rotor | 2.83 kg |

By comparison, the weight of an "A" class motor of the same ratings specified in the JIS (Japan Industrial Standard) is 10 kg. Thus, the weight of the rotor of the invention is less than a third of that of a conventional radial airgap type induction motor.

Following are the test results:

| Item | Efficiency % | Power factor % | Output KW | Torque Sync. watt KW | Kg-m |
|---|---|---|---|---|---|
| Measurement point | | | | | |
| Max. | (79.7) | 86.0 | 2.12 | 2.20 | 1.185 |
| Max. power factor | 77.0 | (90.0) | 2.80 | 3.00 | 1.620 |
| Max. output | 61.9 | 93.0 | (3.90) | 4.74 | 2.560 |
| Max. torque | 53.3 | 78.0 | 3.72 | (4.90) | (2.650) |

| Input KW | Slip % | Current A |
|---|---|---|
| 2.66 | 4.3 | 8.7 |
| 3.64 | 6.7 | 11.7 |
| 6.30 | 17.0 | 21.8 |
| 6.97 | 23.2 | 25.7 |

The Hyland's circle diagram for the above results is shown in FIG. 16.

A comparison between the characteristics of the motor of the present invention, which were calculated by the Hyland's circle diagram method, and of a conventional motor of the same ratings is as follows:

| | Output KW | Efficiency % | Power factor % | Synchronous watt KW |
|---|---|---|---|---|
| Subject motor | 2.2 | 79.5 | 89.0 | 2.31 |
| JIS A motor | 2.2 | 80.5 | 79.0 | 2.36 |

| | Input KW | Slip % | Current A | Starting current A |
|---|---|---|---|---|
| | 2.77 | 4.8 | 9.1 | 37.3 |
| | 2.73 | 6.5 | 9.5 | 60 |

Thus, it has been shown that the core segments made by a cold-forming operation have a superior crystallographic orientation while exhibiting only a slight degradation of magnetic characteristics. This degradation is shown more in an increase in the hysteresis loss than in a decrease of permeability. Since the former has little effect on the properties of the motor, only the advantages of the latter remain.

In a rotor which includes soft iron core segments according to the present invention, when the slip is large (i.e. starting), a large starting torque is obtained because the eddy current loss appearing within the core segments is large. When rotation approaches the synchronous speed, the iron loss within the core segment decreases because the secondary frequency decreases. Therefore, even if it has a secondary conductor of low resistance and provides a small slip, such a motor exhibits characteristics similar to those of a cage type having an increased starting torque.

A rotor according to this invention, which is thin in the axial direction, has an improved power factor since the exciting ampere-turns can be decreased and, thus, a large magnetic flux may be obtained for the same magnetomotive force. Further, since it is possible to increase magnetic flux density by using magnetic material of high permeability, the core weight can be substantially reduced over conventional motors of the radial airgap type. Thus, the motor may be miniaturized and made so light that its moment of inertia is extremely small, resulting in considerably shortened starting and stopping times.

In the event that the core segments and the rotor shaft are secured by die-casting, the core segments and the rotor shaft are fixed very tightly to each other and a very thin rotor of the disc type can be produced.

We claim:

1. A method of manufacturing a disc type rotor for an axial airgap type induction motor, comprising the steps of
    1. cutting electromagnetic pure iron blanks to a predetermined length,
    2. cold-forming the cut blanks to form a wedge-shaped core segments having two parallel wedge-shaped faces, two side faces, a small inner face and a larger outer face, the latter four core segment faces extending in planes mutually perpendicular and perpendicular to the plates of the parallel wedge-shaped faces, the cut blanks being so cold-formed that the crystal flow in the formed segments in a direction perpendicular to the planes of the parallel wedge-shaped faces is highly oriented at and around the larger outer faces and is oriented only a little at and around the small inner faces of the core segments, and
    3. assembling a plurality of the formed core segments on a disc-type support in a circular array so that the parallel wedge-shaped faces of the core segments form opposite rings on the support, the small inner faces constituting the inner periphery of the ring and the larger outer faces constituting the outer periphery thereof.

2. The method of claim 1, wherein flange portions are formed in the core segment during the cold-forming thereof to impart to the core segment a substantially H-shaped cross section.

3. The method of claim 1, wherein the electromagnetic pure iron blank to be cut and cold-formed has a cross sectional area substantially equal to the area of the small inner face of the formed core segment.

4. The method of claim 1, wherein one end of the cut blank is chiefly compressed during cold-forming to form the larger outer face of the formed segment.

* * * * *